United States Patent [19]

Marbry et al.

[11] Patent Number: 5,692,111
[45] Date of Patent: Nov. 25, 1997

[54] AUTOMATIC INSTALLATION OF PRINTERS IN A DISTRIBUTED ENVIRONMENT

[75] Inventors: Jonathan E. Marbry; Samuel J. McKelvie, both of Bellevue; David H. Tryon, Redmond; Lin F. Shaw, Redmond; Chia-Chi Teng, Redmond, all of Wash.

[73] Assignee: Microsoft Corporation, Redmond, Wash.

[21] Appl. No.: 641,087

[22] Filed: Apr. 29, 1996

Related U.S. Application Data

[63] Continuation of Ser. No. 318,070, Oct. 5, 1994, abandoned.

[51] Int. Cl.$^6$ ............................................. H04N 1/23
[52] U.S. Cl. ............................................ 395/114; 395/115
[58] Field of Search ........................ 395/114, 101, 395/115, 112, 111, 110

[56] References Cited

U.S. PATENT DOCUMENTS

| | | | |
|---|---|---|---|
| 4,698,688 | 10/1987 | Ochi et al. | 358/257 |
| 4,829,468 | 5/1989 | Nonaka et al. | 364/900 |
| 5,150,454 | 9/1992 | Wood et al. | 395/115 |
| 5,228,118 | 7/1993 | Sasaki | 395/112 |
| 5,268,993 | 12/1993 | Ikenoue et al. | 395/114 |
| 5,287,194 | 2/1994 | Lobiondo | 358/296 |
| 5,287,434 | 2/1994 | Bain et al. | 395/101 |
| 5,299,296 | 3/1994 | Padalino et al. | 395/112 |
| 5,303,336 | 4/1994 | Kageyama et al. | 395/114 |
| 5,327,526 | 7/1994 | Nomura et al. | 395/115 |
| 5,353,388 | 10/1994 | Motoyama | 395/117 |
| 5,371,837 | 12/1994 | Kimber et al. | 395/114 |

OTHER PUBLICATIONS

McClelland, Deke, "Macintosh System 7.1: Everything You Need to Know," second edition, 1992, pp. 106–110, 379, 384–387 Alameda, Ca.

*Microsoft® Windows NT™ System Guide*, Microsoft Corporation, Mar. 1993, Chapter 6, "Print Manager," pp. 173–201.

McClelland, Deke, *Macintosh® System 7.1: Everything You Need To Know*, 2d. ed., Sybex®, San Francisco, California 1993, pp. 106–110, 379, 384–387.

*Primary Examiner*—Raymond J. Bayerl
*Assistant Examiner*—Steven P. Sax
*Attorney, Agent, or Firm*—Seed and Berry LLP

[57] ABSTRACT

An operating system provides a point-and-print capability to users of the workstation. The point-and-print capability allows a user to print on any printer available within a distributed system by simply selecting a printer and requesting to print on the printer. The retrieval of configuration information and installation of the printer is performed transparently relative to the user of the workstation. The required printer configuration information is retrieved from a database that is maintained at a network server for the network that includes the target printer. A heuristic technique is employed to obtain complete printer configuration information when such printer configuration is not fully available from the network server.

26 Claims, 9 Drawing Sheets

AUTOMATIC INSTALLATION OF PRINTERS IN A DISTRIBUTED ENVIRONMENT

CROSS-REFERENCE TO RELATED APPLICATION

This application is a continuation of U.S. patent application Ser. No. 08/318,070, filed Oct. 5, 1994, now abandoned.

TECHNICAL FIELD

The present invention relates generally to data processing systems and, more particularly, to the automatic installation of printers in a distributed environment.

BACKGROUND OF THE INVENTION

The Microsoft WINDOWS NT operating system, sold by Microsoft Corporation of Redmond, Wash., provides a point and print capability. In other words, a user of the workstation that runs the operating system merely needs to identify a target printer on the network (such as by pointing a mouse cursor at an icon for the printer) and then request to print a document in order to print on the target printer. Critical printer configuration information (such as the printer driver and other printer configuration data) is stored on the print servers for network printers. Each print server is a dedicated machine that runs the same operating system and is responsible for controlling a group of one or more printers. The print server stores the critical printer configuration information for the printers that are associated with it. When an application requests to initiate a print job, the print server retrieves a copy of printer driver for the printer to the requesting workstation and carries out the print request via a remote procedure call ("RPC") mechanism. The retrieval of the printer configuration information and the installation of the printer are transparent to the user.

SUMMARY OF THE INVENTION

In accordance with a first aspect of the present invention, a method is practiced in a distributed system that has a workstation and a remote network. The remote network includes a printer and a network server. In this method, a database of printer configuration information is provided in shared memory at the network server. The printer configuration information stored at the network server includes printer configuration information for the printer in the network. The printer configuration information for the printer in the remote network is retrieved from the shared memory of the network server in response to request from the workstation. This retrieved information is used to install the printer for use by the workstation. The preferred embodiment may be practiced in an environment with multiple workstations and multiple servers. The servers and workstations may be running different platforms.

In accordance with another aspect of the present invention, a method is practiced in a distributed system having a workstation and a network with printers and a network server. In this method, configuration information for the printers is provided at the network server. In response to a request from the workstation to print on a selected one of the printers, printer configuration information for the selected printer is copied from the network server to the workstation. The printer configuration information is installed at the workstation and the selected printer is then used to service the print request.

In accordance with a further aspect of the present invention, a database of printer configuration information and printer drivers is provided at a network server. A database of printer configuration information and printer drivers for installable printers is provided at a server. Available printer configuration information is retrieved from the network server for one of the printers in the network. This available printer configuration information is provided to the workstation. It is determined that the provided printer configuration information is incomplete and in response, the locally maintained database is accessed to retrieve the complete configuration information and a printer driver for the selected printer.

In accordance with yet another aspect of the present invention, a distributed system includes a network that has at least one printer for executing print jobs and a network server for regulating access to the network. The network server includes a database of printer configuration information for the printer. The distributed system also includes a workstation that is interfaced with the network. The workstation may issue a request to execute a print job on the printer in the network. The workstation runs an operating system that includes a retrieval mechanism and an installer. The retrieval mechanism retrieves the printer configuration information for the network server in response to a request or execute a print job. The installer installs the printer configuration information that is retrieved by the retrieval mechanism so that the workstation may use the printer.

DETAILED DESCRIPTION OF THE INVENTION

The preferred embodiment of the present invention provides a point and print capability within an operating system. This point and print capability allows a user to initiate a print job on a printer within a distributed system by merely identifying the printer and making the request to print. Any installation and configuration that is required for the document to be printed on the printer is performed automatically and transparently by the operating system.

Figure 1:
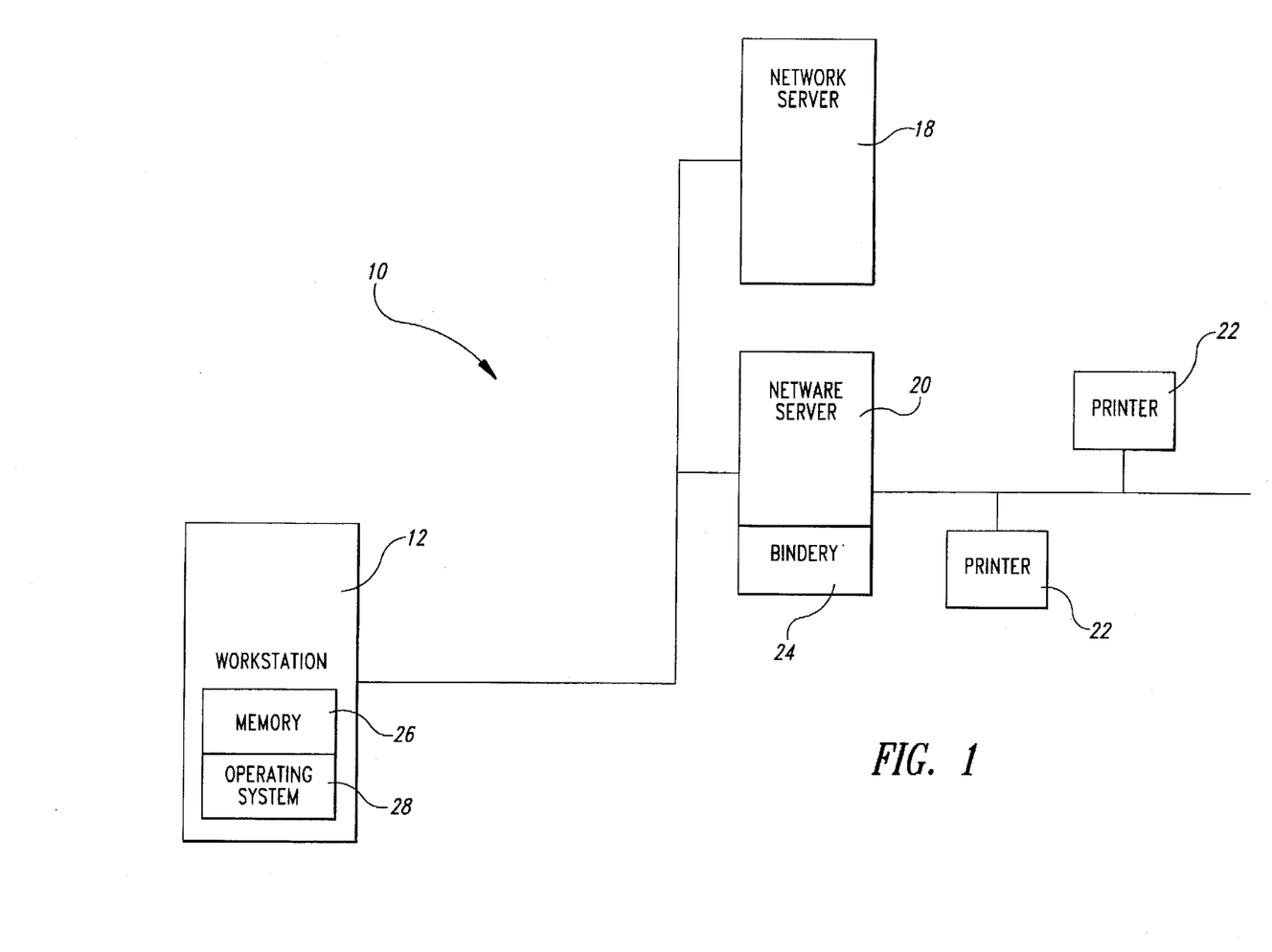
FIG. 1 is a block diagram of a distributed system that is suitable for practicing a preferred embodiment of the present invention.

FIG. 1 is a block diagram of a distributed system 10 that is suitable for practicing the preferred embodiment of the present invention. The distributed system 10 includes a workstation 12 that is interfaced with different networks. Network server 18 serves as a server for gaining access to a first type of network, and network server 20 is a network server for gaining access to a second type of network. For illustrative purposes below, it is assumed that network server 18 is a Microsoft network server that runs a network operating system from Microsoft Corporation and network server 20 is a Netware server that runs a copy of the Netware network operating system, version 3.11, sold by Novell Corporation of Provo, Utah. The network served by network server 20 includes printers 22.

The workstation 12 includes a memory 26 that holds a copy of an operating system 28. This operating system 28 includes client code for acting as a client of the network server 20. The operating system 28 also includes a number of graphical device interface (GDI) functions that help to configure and install printers. In the preferred embodiment of the present invention, the operating system 28 is an embellished version of the Microsoft WINDOWS operating system.

Figure 2A:
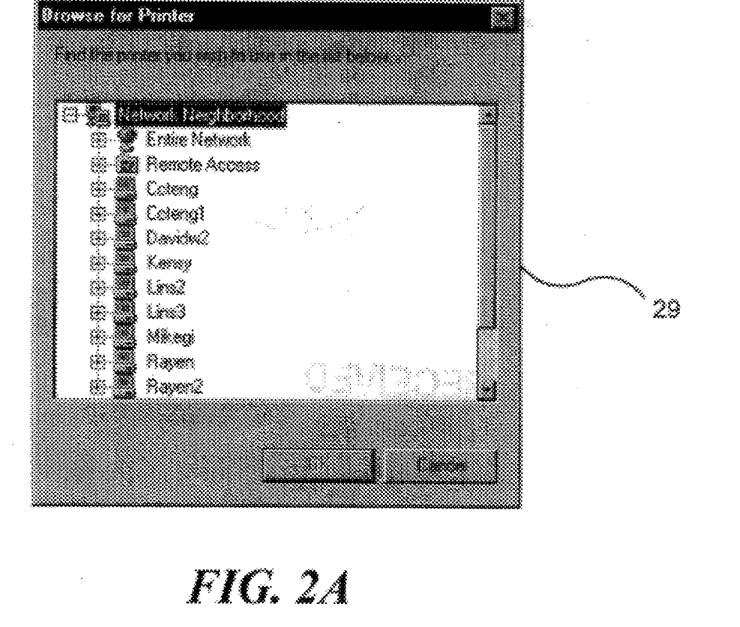
FIGS. 2A and 2B illustrate a user interface that is used to select a printer for printing in the preferred embodiment of the present invention.
Figure 2B:
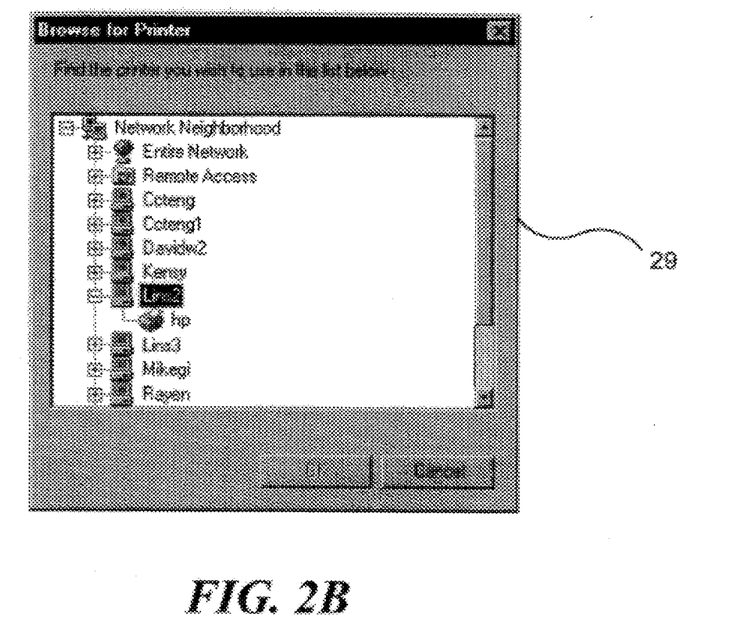

The operating system 28 provides a user interface that allows the user to select a printer that the user wishes to employ to print a document. The list of printers available to a user may include printers that are part of a network served by the network servers 18 or 20. For example, as shown in FIG. 2A, a user interface 29 provides a user with a list of servers that are available in a network neighborhood. When a user selects one of the servers, such as server "Lins2," a list of printers (e.g., "hp" in FIG. 2B) on the server is displayed. A difficulty arises when the user requests to print a document on a printer in a network for which the configuration information and printer driver are not locally installed. The preferred embodiment of the present invention overcomes this difficulty by transparently copying the requisite configuration information and printer driver to a location that is local to the workstation so that the workstation may access the printer configuration data and printer driver to print the document on the remote printer.

The Netware server 20 holds an object-oriented database known as the "bindery" that contains definitions for users, groups, security and other objects of the associated network. The bindery 24 is like the bindery found in the Netware network operating system, version 3.11. The bindery 24 is used in the preferred embodiment of the present invention to hold the printer configuration and driver information for the printers of the network server 20.

Figure 3:
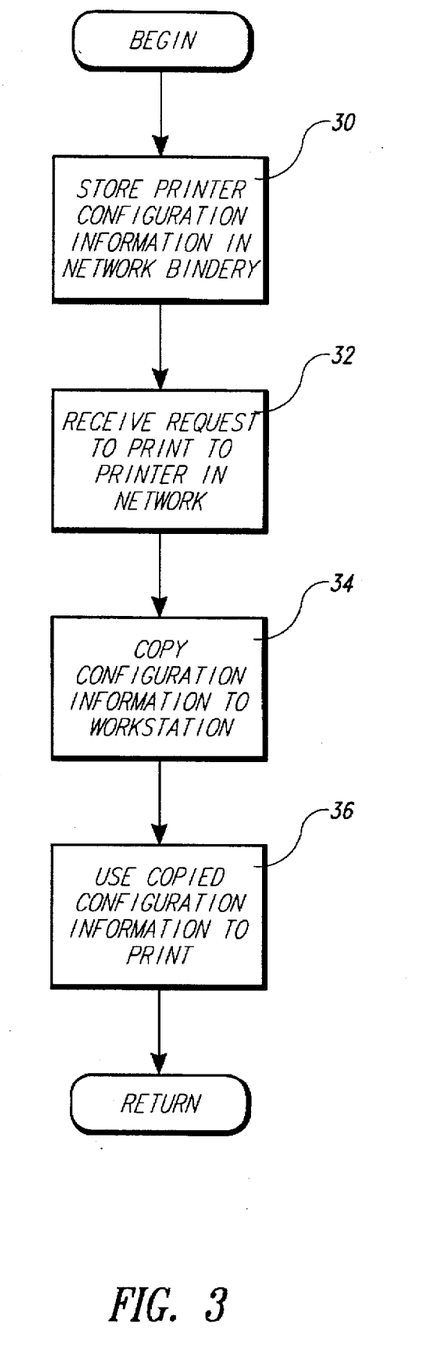
FIG. 3 is a flowchart illustrating the steps that are performed to facilitate a point-and-print capability in accordance with the preferred embodiment of the present invention.

FIG. 3 is a flowchart illustrating the steps that are performed in the preferred embodiment of the present invention to support the point and print functionality. Initially, the printer configuration information, including information about the printer driver, is stored within the bindery 24 (step 30 in FIG. 3). The Netware network operating system provides a number of functions that can be used to add such information to the bindery 24. The operating system 28 acts as a client of the Netware server 20 and requests that the configuration information be stored in the network bindery when the system is booted. The operating system 28 then receives a request from a program running on a workstation 12 to print to a printer 22 within the network of the Netware server 20 (step 32 in FIG. 3). The operating system 28 (acting as a client) requests the configuration information to be copied from the bindery 24 to memory, such as memory 26 (step 34). In particular, the information gets installed in the local registry which is used to hold configuration information. The registry is much like the registry found in the Microsoft WINDOWS NT operating system. This copied configuration information and printer driver are then used to print on the printer 22 (step 36).

As mentioned above, the operating system provides an implementation of the WIN32 API as specified by Microsoft Corporation. The WIN32 API provides a number of functions for manipulating printers to configure and install printers. Some of these functions will be described in more detail below.

Figure 4:
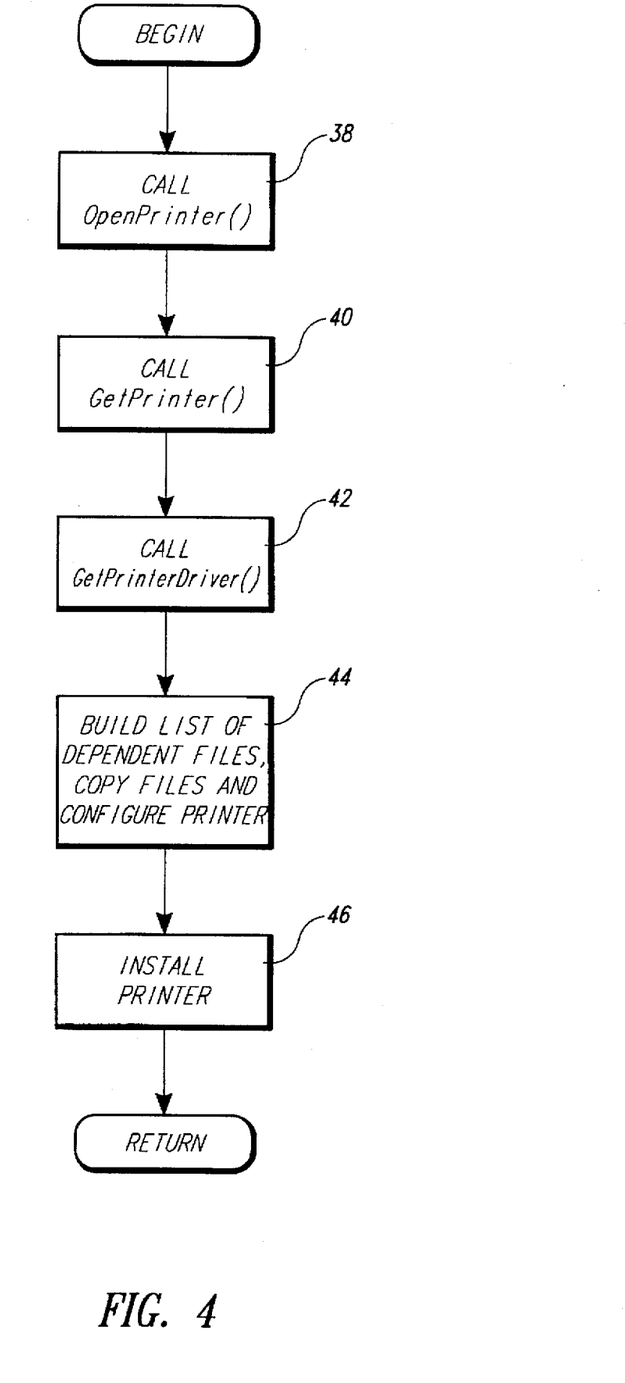
FIG. 4 is a flowchart illustrating the steps that are performed to retrieve printer configuration information and install a printer in the preferred embodiment of the present invention.

FIG. 4 is a flowchart showing in more detail how functions in the WIN32 API are utilized to configure and install the requested printer 22. Initially, the operating system 28 calls the OpenPrinter( ) function. The name of the desired target printer is passed as a parameter of the OpenPrinter( ) function call. The OpenPrinter( ) function returns a "handle" for the target printer (step 38). The handle is a unique numerical identifier for the printer that will be used to later identify the printer in other function calls.

A call is then made to the GetPrinter( ) function, which retrieves data stored in the bindery for the target printer. The handle to the printer that was returned by the OpenPrinter( ) function is passed as a parameter to the GetPrinter( ) function to identify the target printer. The GetPrinter function returns a PRINTER_INFO_2 structure that holds data about the target printer. In the preferred embodiment of the present invention, the PRINTER_INFO_2 data structure is of the following form:

```
typedef struct _PRINTER_INFO_2 { /* pri2 */
    LPTSTR              pServerName;
    LPTSTR              pPrinterName;
    LPTSTR              pShareName;
    LPTSTR              pPortName;
    LPTSTR              pDriverName;
    LPTSTR              pComment;
    LPTSTR              pLocation;
    LPTDEVMODE          PDevMode;
    LPTSTR              pSepFile;
    LPTSTR              pPrintProcessor;
    LPTSTR              pDatatype;
    LPTSTR              pParameters;
    PSECURITY_DESCRIPTOR pSecurityDescriptor;
    DWORD               Attributes;
    DWORD               Priority;
    DWORD               DefaultPriority;
    DWORD               StartTime;
    DWORD               UntilTime;
    DWORD               Status;
    DWORD               cJobs;
    DWORD               AveragePPM;
} PRINTER_INFO_2;
```

At this point in the process, the operating system knows the handle to the printer and has received data about the printer. The GetPrinterDriver( ) function is called to obtain printer driver data for the given printer from the bindery of the print server (step 42). A DRIVER_INFO_3A or a DRIVER_INFO_2 structure is returned in response to this function call. The operating system first tries to get a DRIVER_INFO_3A structure, but if cannot get a complete DRIVER_INFO_3A structure, it tries to get a DRIVER_INFO_2 structure. An error message is returned in response to the GetPrinterDriver( ) function call, if a complete DRIVER_INFO_3A structure is not available. The DRIVER_INFO_3A structure has the following format:

```
typedet struct DRIVER_INFO_3A {
    DWORD   cversion;
    LPSTR   pName;          //QMS 810
    LPSTR   pEnvironment;   //Win32 x 86
    LPSTR   pDriverPath;    //c:\drivers\pscript.dll
    LPSTR   pDataFile;      //c:\drivers\QMS810.PPD
    LPSTR   pConfigFile;    //c:\drivers\PSCRPTUI.DLL
    LPSTR   pHelpFile;      //c:\drivers\PSCRPTUI.HLP
```

```
    LPSTR     pDependentFiles;
//PSCRIPT.DLL\0QMS810.PPD\OPSCRIPTUI.DLL
    LPSTR     pMonitorName;        //"PostScript monitor"
    LPSTR     p/DefaultDataType;   //"EMF"
}DRIVER_INFO_3A, *PDRIVER_INFO_3A,
*LPDRIVER_INFO_3A;
```

The DRIVER_INFO_2 structure has the following format:

```
typedef struct_DRIVER INFO_2 { /* dri2 */
    DWORD        cVersion;
    LPTSTR       pName;
    LPTSTR       pEnvironment;
    LPTSTR       pDriverPath;
    LPTSTR       pDataFile;
    LPTSTR       pConfigFile;
} DRIVER INFO 2;
```

A list of dependent files is then built and these files are copied to the workstation 10, wherein the printer is configured (step 44). The list of dependent files is obtained from the DRIVER_INFO_3A structure, if one is available and if the structure includes a list of dependent files. If, however, the DRIVER_INFO_3A structure is not available or if the available structure does not include a list of dependent files, the heuristic approach must adopted as described below. The list of dependent files is printer model dependent. When a printer is installed on a print server, a list of files that is needed for the printer model is determined by the printer installation program. This information may be stored within the DRIVER INFO 3A structure.

The requisite configuration information is then added to the local database of configuration information (i.e., the registry) to install the printer (step 46). In particular, the AddPrinterDriver( ), AddPrintProcessor( ), AddMonitor( ), and AddPrinter( ) functions are called to add the print driver, print processor, monitor and printer configuration information to the registry. The print processor is a dynamic link library (DLL) that interprets data types to convert data from one data type to another data type, and the print monitor monitors a port associated with the printer. Print processor and monitors are known in the art.

Once the printer is successfully installed by completing the steps described above, the application program that prints a document may then begin printing. The installation that adds the printer driver, print processor monitor and printer information to the local memory space is performed by the network client portion of the operating system 28.

Figure 5:
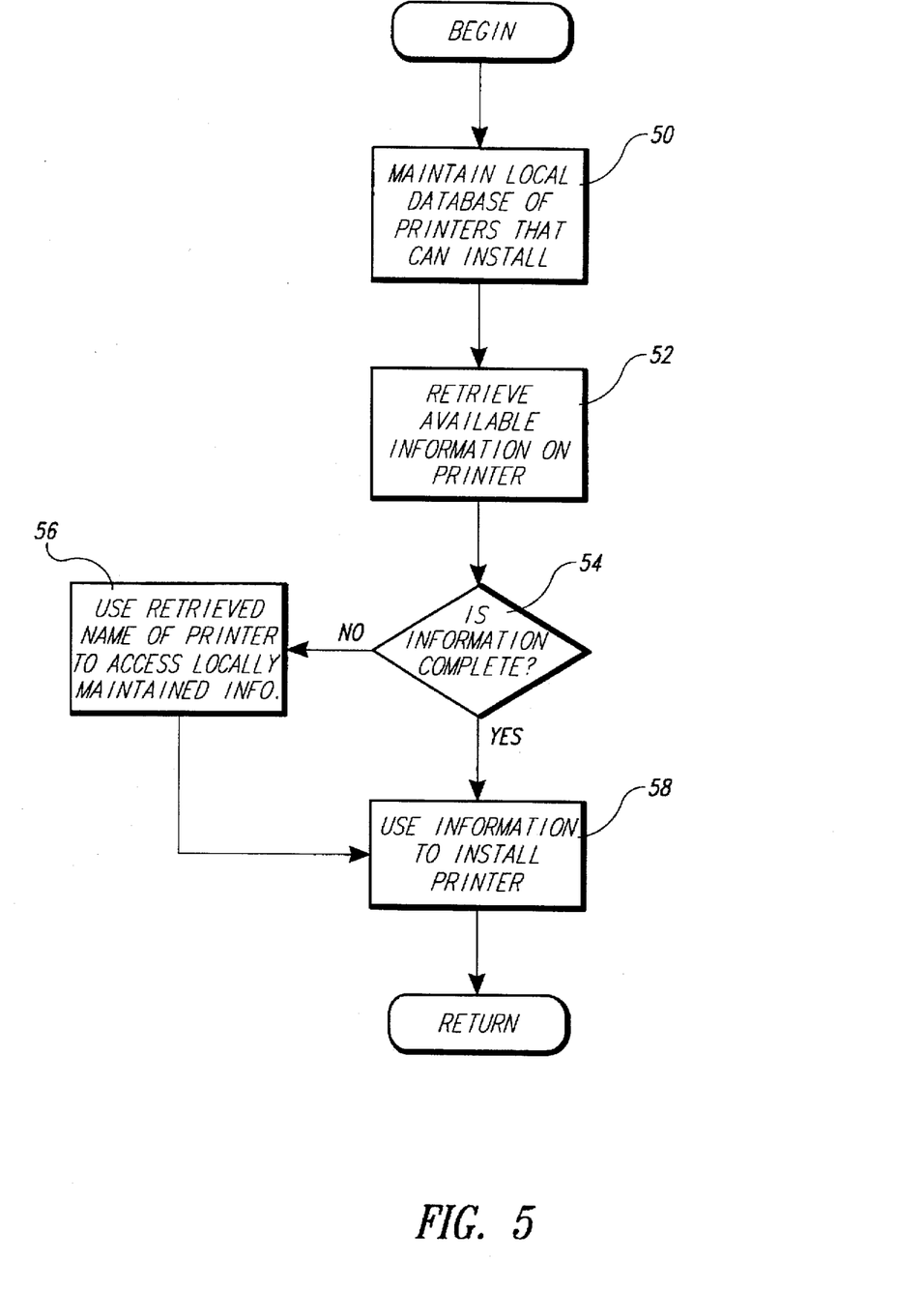
FIG. 5 is a flowchart illustrating the steps that are performed to attempt to obtain complete printer configuration information in the preferred embodiment of the present invention.

In some instances, the operating system 28 will be unsuccessful in retrieving complete information for the target printer. In such instances, the preferred embodiment of the present invention employs a heuristic to attempt to discern the appropriate information about the printer. FIG. 5 is a flowchart illustrating the steps that are performed by this heuristic. The operating system 28 maintains a local database of printers that it can install (step 50 in FIG. 5). This local database includes appropriate configuration parameters and printer drivers. The available information on the printer is retrieved as described above (step 52). The operating system 28 then checks whether the retrieved information is complete (step 54). If the information is not complete, it is likely that the information specifies the type of printer the target printer is. This name of the type of printer is then used to access the local database to retrieve configuration information and a printer driver for that type of printer (step 56).

The retrieved information is then used to install the printer (step 58). If the information that is retrieved is complete, as checked in step 54, the retrieved information is used to install the printer (see step 58).

The above description has focused on the instance wherein a printer is automatically installed by requesting to print on the printer. It should also be appreciated that the printer may be alternatively installed by explicit user request. The installation is performed as described above, but is performed using a printer installation wizard.

Figure 6A:
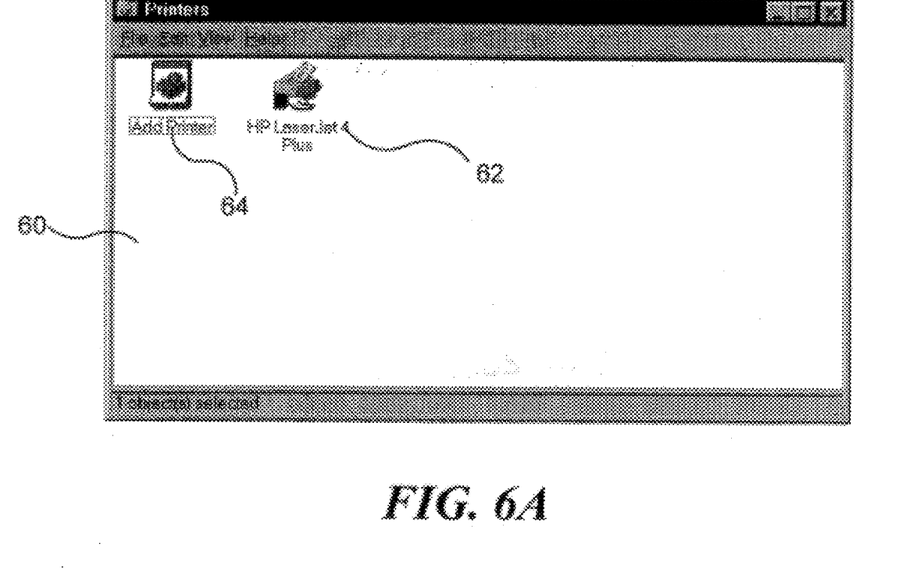
FIGS. 6A–6G show user interface elements used to install a printer using an installation wizard of the preferred embodiment of the present invention.
Figure 6B:
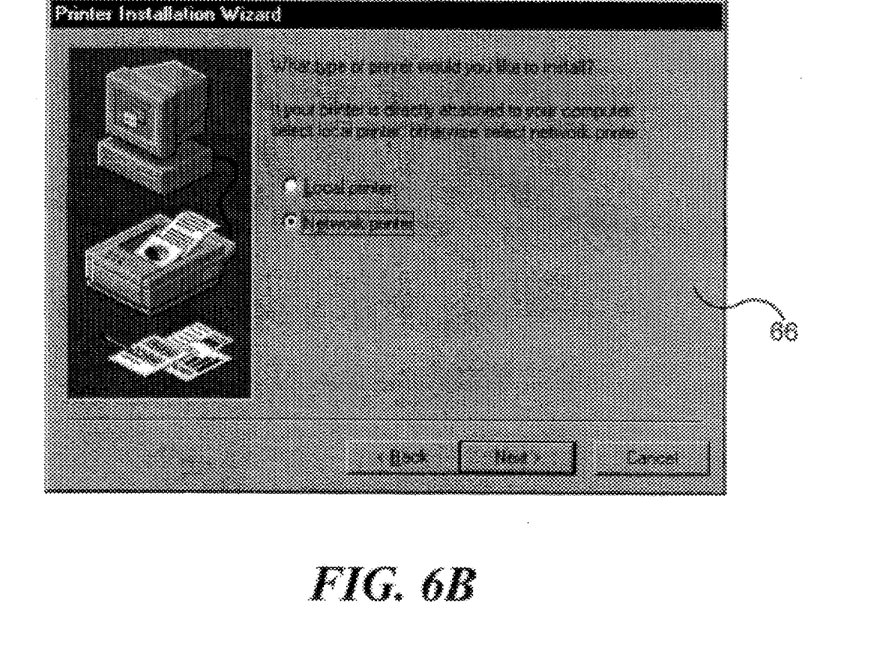
Figure 6C:
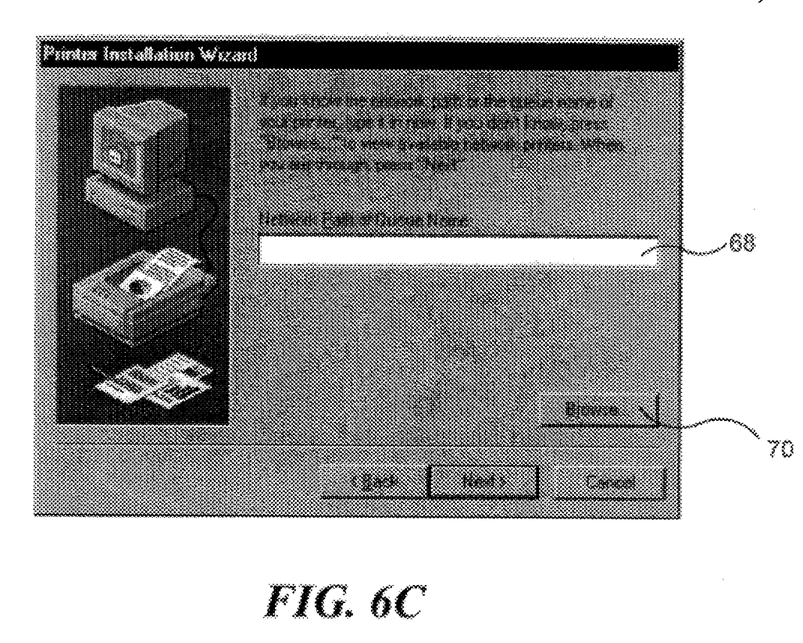

FIG. 6A shows an example of the printers folder that is provided by the operating system 28. When the printers folder is opened, the open printers window 60 includes icons for installed printers, like icon 62 in FIG. 6A, and an icon 64 for invoking the printer installation wizard. When a user double clicks on the printer installation wizard icon 64, the printer installation wizard window 66 (FIG. 6B) is displayed. The printer installation wizard window 66 asks the user to select whether he wishes to install a local printer or a network printer. In the example shown in FIG. 6B, the user has selected a network printer. The printer installation window then displays an edit box 68, as shown in FIG. 6C, which requests the user to provide a network path or queue name. Alternatively, the user may select the browse button 70 to see what printers are available for installation.

Figure 6D:
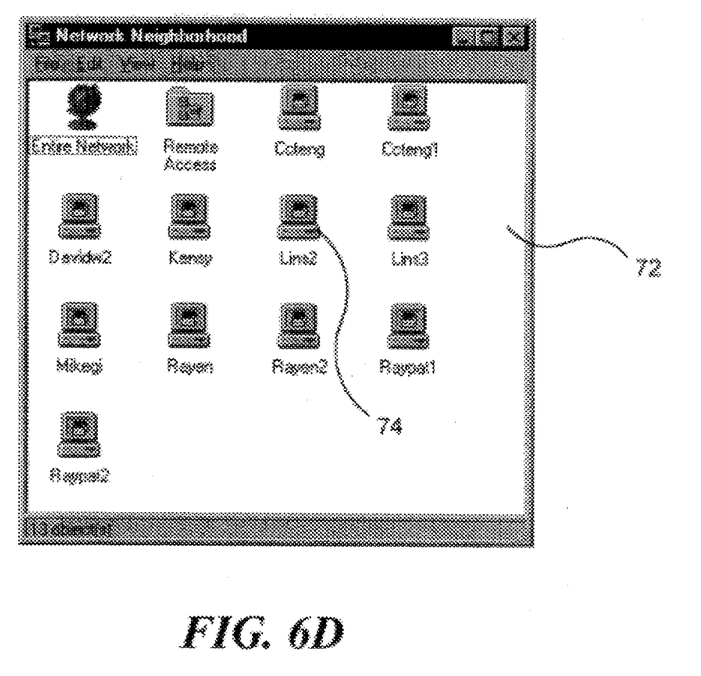
Figure 6E:
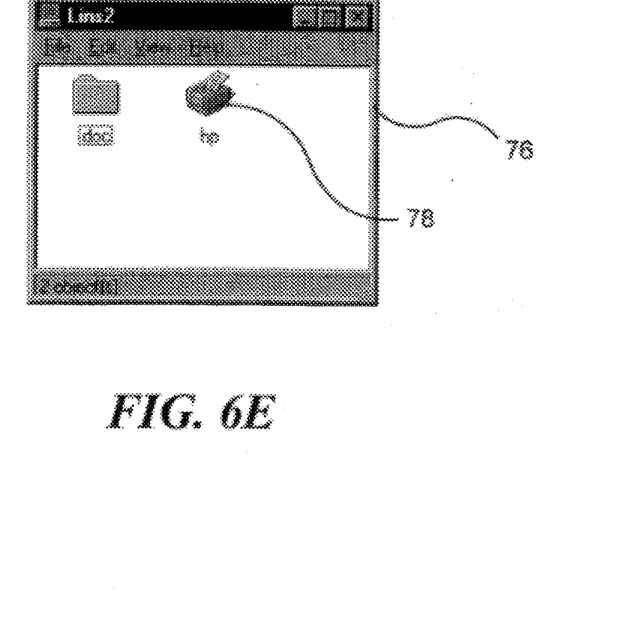

FIG. 6D shows an example of what is displayed when a user selects the browse button 70 in FIG. 6C. A window 72 displays servers that are visible within a network neighborhood. A separate icon, like icon 74, is displayed for each server within the network neighborhood. When a user selects one of the servers, like the "Lins2" server (such as by double clicking on the server icon 74), a window 76 (FIG. 6E) for the server is displayed. The server window 76 includes icons, like icon 78, for printers that are controlled by the server.

Figure 6F:
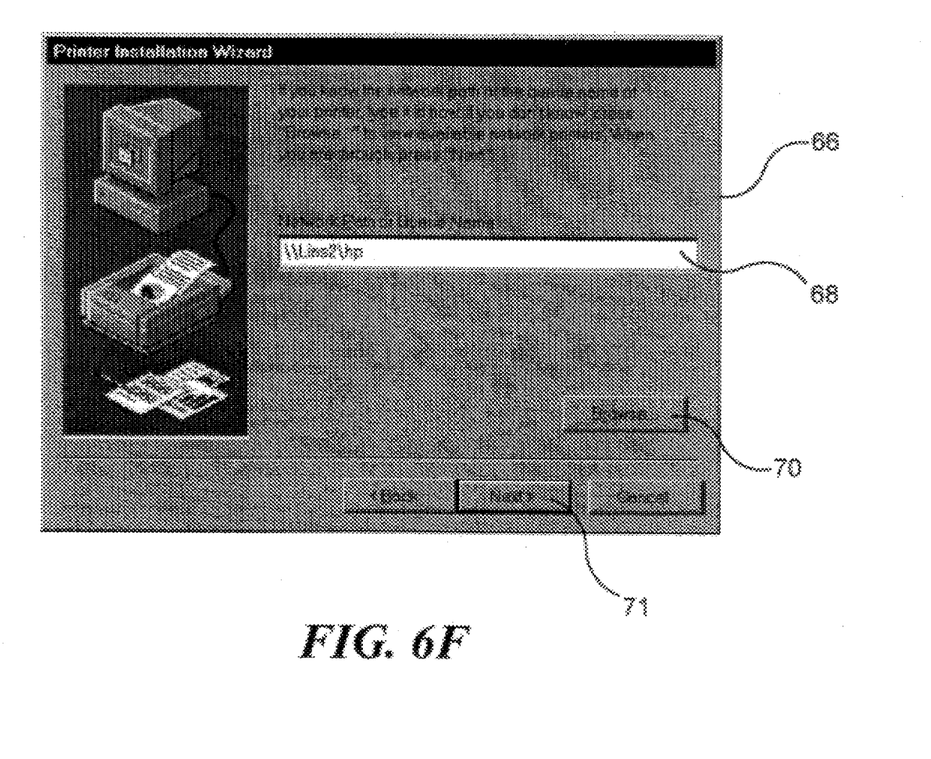
Figure 6G:
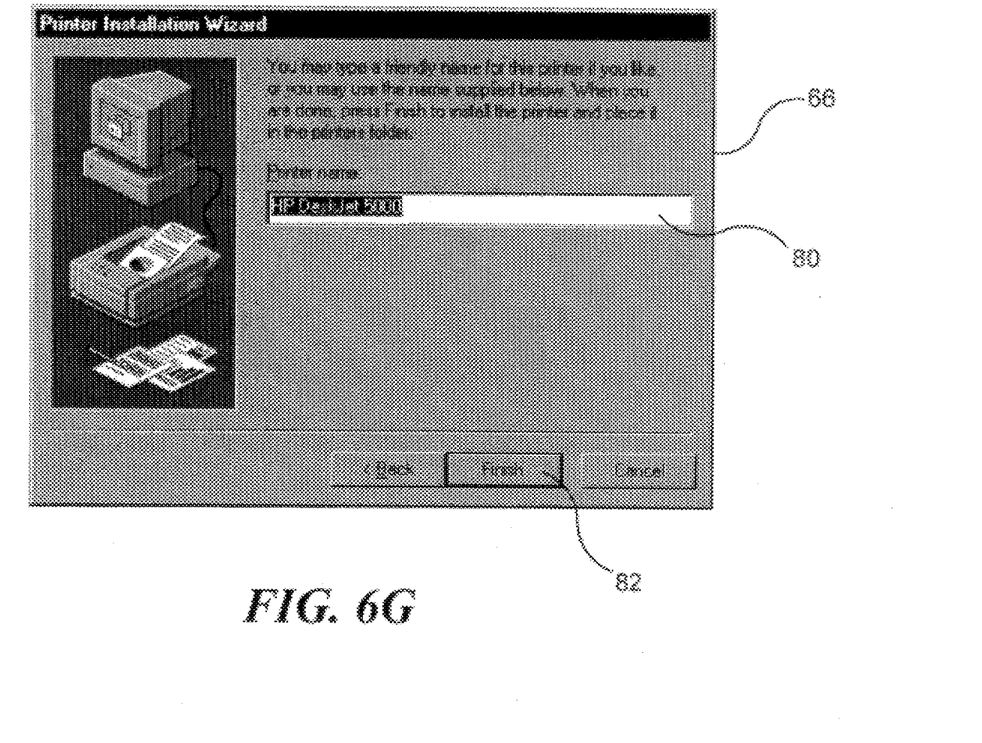

Suppose a user selects the printer associated with icon 78 in FIG. 6C. In such a case, edit box 68 (FIG. 6F) is updated to automatically hold the network path name for the selected printer. The user then presses the next button 71, and the type of printer is determined by the system. The type of printer is displayed as a suggested printer name within edit box 80 (FIG. 6G) in the printer installation wizard. A user may choose instead a different or more friendly name for the printer using the edit box 80. The user then selects the finish button 82 to complete the installation.

While the present invention has been described with reference to a preferred embodiment thereof, those skilled in the art will appreciate the various changes in form and detail may be departing from the intended scope of the present invention as defined in the independent claims.

We claim:

1. In a distributed system comprising a first workstation and a remote network having a printer and a network server, a method comprising the computer-implemented steps of:

providing a database of printer configuration information, including printer configuration information for the printer in the remote network, in shared memory at the network server;

retrieving the printer configuration information for the printer from the shared memory of the network server in response to a request from the first workstation, said printer configuration information including information that identifies the printer;

using the information that identifies the printer to identify a printer driver to be installed at the first workstation and to determine where the printer driver is stored in the distributed system; and retrieving the printer driver from where it is stored, installing the identified printer driver at the first workstation and storing at least some of the retrieved printer configuration information in the local storage of the first workstation.

2. The method of claim 1 wherein the first workstation runs an operating system and the operating system performs the step of retrieving the printer configuration information.

3. The method of claim 2 wherein the operating system performs the step of installing the identified printer driver.

4. The method of claim 2, wherein the network server runs a network operating system that differs from the operating system run by the first workstation.

5. The method of claim 1, further comprising the step of running client code on the first workstation for interacting with the network server.

6. The method of claim 1, further comprising the step of issuing a print request to print on the printer of the remote network from the first workstation and wherein the steps of retrieving the printer configuration information, retrieving the identified printer driver, installing the identified printer driver and storing at least some of the retrieved printer configuration information in the local storage are performed in response to the request.

7. The method of claim 1, further comprising the steps of:
running a program on the first workstation; and
issuing a request to print on the printer of the remote network from the program, wherein the steps of retrieving the printer configuration information, retrieving the identified printer driver, installing the identified printer driver and storing at least some of the retrieved printer configuration information in the local storage are performed transparently relative to the first workstation.

8. The method of claim 1 wherein the distributed system includes a second workstation and wherein the method further comprises the steps of:
retrieving the printer configuration information for the printer from the shared memory of the network server in response to a request from the second workstation, said printer configuration information including information that identifies the printer;
using the information that identifies the printer to identify a printer driver to be installed at the second workstation and to determine where the printer driver is stored in the distributed system; and
retrieving the printer driver from where it is stored, installing the identified printer driver at the second workstation and storing at least some of the retrieved printer configuration information in the local storage of the second workstation.

9. The method of claim 8 wherein the second workstation runs a different operating system than the first workstation runs.

10. The method of claim 8 wherein the second workstation runs a different version of the operating system than the first workstation runs.

11. The method of claim I wherein the distributed system includes a second network server for a second remote network having a second printer and wherein the method further comprises the steps of:
providing a database of printer configuration information, including printer configuration information for the second printer in the second remote network, in shared memory at the second network server;
retrieving the printer configuration information for the second printer from the shared memory of the second network server in response to a request from the first workstation, said printer configuration information including information that identifies the second printer;
using the information that identifies the second printer to identify a printer driver to be installed at the first workstation and to determine where the second printer driver is stored in the distributed system; and
retrieving the second printer driver from where it is stored, installing the identified printer driver at the first workstation and storing at least some of the retrieved printer configuration information in the local storage of the first workstation.

12. In a distributed system comprising a workstation having local storage and a remote network having at least one printer and a network server, a method comprising the computer-implemented steps of:
providing a database of printer configuration information and printer drivers at the network server for the printers in the network;
providing a database of printer configuration information and printer drivers for installable printers of the workstation in the local storage of the workstation;
retrieving available printer configuration information for a selected one of the printers in the network from the network server and providing the available printer configuration information to the workstation; and
determining that the provided printer configuration information is incomplete and in response, accessing the database in the local storage to retrieve complete printer configuration information and a printer driver for the selected printer.

13. The method of claims 12, further comprising the step of installing the selected printer using the retrieved complete printer configuration information and printer driver for the selected printer.

14. The method of claim 12 wherein the step of retrieving available printer configuration information comprises the step of retrieving information that identifies what type of printer the selected printer is.

15. The method of claim 14 wherein the step of accessing the database in the local storage comprises the step of using the information that identifies the type of printer the selected printer is as an index to retrieve complete printer configuration information and a printer driver for the selected printer from the locally maintained database.

16. A distributed system comprising:
a network having at least one printer for executing jobs;
a network server for regulating access to the network and having a database of printer configuration information for the printer; and
a workstation interfaced with the network and having local storage for issuing a request to execute a print job on the printer in the network, said workstation running an operating system, comprising:
a retrieval mechanism for retrieving the printer configuration information from the network server in response to the request to execute the print job on the printer, said printer configuration information including information that identifies the printer; and
an installer for using the information that identifies the printer to identify and retrieve a printer driver for the printer, for installing the printer driver at the workstation and for storing at least some of the retrieved printer configuration information in the local storage.

17. The distributed system of claim 16 wherein the network includes multiple printers.

18. The distributed system of claim 16, wherein the network server runs a network operating system that differs from the operating system that is run on the workstation.

19. The distributed system of claim 16 wherein the operating system further comprises client code for enabling the workstation to act as a client of the network server.

20. The distributed system of claim 16, further comprising a second network having at least one printer and a second network server for regulating access to the printer of the second network wherein said second network server includes an additional database of printer configuration information for the printer of the second network.

21. The distributed system of claim 20 wherein the retrieval mechanism of the workstation includes a means for retrieving the printer configuration information for the printer in the second network from the second network server in response to a request to execute a print job on the printer of the second network and the installer of the workstation includes a means for using the information that identifies the printer to identify and retrieve a printer driver for the printer for installing the printer driver at the workstation and for storing at least some of the retrieved printer configuration information in the local storage.

22. The distributed system of claim 16, further comprising a second workstation running the operating system.

23. The method of claim 1 wherein the first workstation includes a registry of configuration information and wherein the step of storing at least some of the retrieved configuration information in the local storage comprises storing at least some of the retrieved configuration information in the registry.

24. A computer-readable storage medium for use in a distributed system that has a first workstation with a local storage and a remote network having a printer and a network server that stores a database of printer configuration information, including printer configuration information for the printer in the remote network, said medium holding instructions for:

retrieving the printer configuration information for the printer from the shared memory of the network server in response to a request from the first workstation, said printer configuration information including information that identifies the printer;

using the information that identifies the printer to identify a printer driver to be installed at the first workstation and to determine where the printer driver is stored in the distributed system; and retrieving the printer driver from where it is stored, installing the identified printer driver at the first workstation and storing at least some of the retrieved printer configuration information in the local storage of the first workstation.

25. The computer-readable storage medium of claim 24 wherein the medium holds a copy of an operating system and the operating system performs the retrieving of the printer configuration information.

26. The computer-readable storage medium of claim 25 wherein the operating system also performs the installing of the identified printer driver at the first workstation.

* * * * *